(12) United States Patent
Scheifler et al.

(10) Patent No.: US 6,934,758 B2
(45) Date of Patent: Aug. 23, 2005

(54) STACK-BASED ACCESS CONTROL USING CODE AND EXECUTOR IDENTIFIERS

(75) Inventors: Robert W. Scheifler, Somerville, MA (US); Li Gong, Menlo Park, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 445 days.

(21) Appl. No.: 10/143,574

(22) Filed: May 13, 2002

(65) Prior Publication Data

US 2002/0174224 A1 Nov. 21, 2002

Related U.S. Application Data

(63) Continuation of application No. 09/537,746, filed on Mar. 30, 2000, now Pat. No. 6,389,540, which is a continuation of application No. 09/044,915, filed on Mar. 20, 1998, now Pat. No. 6,138,238, which is a continuation-in-part of application No. 08/988,431, filed on Dec. 11, 1997, now Pat. No. 6,192,476.
(60) Provisional application No. 60/076,048, filed on Feb. 26, 1998.

(51) Int. Cl.$^7$ .............................................. G06F 15/16
(52) U.S. Cl. .................... 709/229; 709/201; 709/202; 709/217; 709/225; 719/316; 719/330
(58) Field of Search ................................. 709/201, 202, 709/217, 225, 229; 719/316, 330

(56) References Cited

U.S. PATENT DOCUMENTS

| | | | |
|---|---|---|---|
| 4,430,699 A | 2/1984 | Segarra et al. | 364/200 |
| 4,491,946 A | 1/1985 | Kryskow, Jr. et al. | |
| 4,558,413 A | 12/1985 | Schmidt et al. | 364/300 |
| 4,713,806 A | 12/1987 | Oberlander et al. | |
| 4,809,160 A | 2/1989 | Mahon et al. | 713/200 |
| 4,823,122 A | 4/1989 | Mann et al. | |
| 4,939,638 A | 7/1990 | Stephenson et al. | |
| 4,956,773 A | 9/1990 | Saito et al. | |
| 5,088,036 A | 2/1992 | Ellis et al. | |

(Continued)

FOREIGN PATENT DOCUMENTS

| | | |
|---|---|---|
| EP | 0 300 516 A3 | 1/1989 |
| EP | 0 351536 A3 | 1/1990 |
| EP | 0 384 339 A | 2/1990 |
| EP | 0 384 339 A3 | 8/1990 |
| EP | 0 472 874 A1 | 3/1992 |
| EP | 0 474 340 A | 3/1992 |

(Continued)

OTHER PUBLICATIONS

Auto–ID Center, "Auto–ID Savant Specification 1.0," Version of Sep. 1, 2003, pp. 1–58.

Smith, H. A. et al., "Object–Oriented Technology: Getting Beyond the Hype," The Data Base for Advances I Information Systems, Spring 1996 (vol. 27, No. 2), pp. 20–29.

(Continued)

Primary Examiner—Saleh Najjar
(74) Attorney, Agent, or Firm—Finnegan, Henderson, Farabow, Garrett & Dunner, L.L.P.

(57) ABSTRACT

A system regulates access to resources requested by an operation executing on a computer. The operation invokes a plurality of methods that operate upon code during execution. The system includes a policy file, a call stack, and an execution unit. The policy file stores permissions for each of the resources. The permissions authorize particular types of access to the resource based on a source of the code and an executor of the code. The call stack stores representations of the methods and executors in an order of invocation by the operation. The execution unit grants access to the resource when the types of access authorized by the permissions of all of the methods and executors on the call stack encompass the access requested by the operation.

39 Claims, 7 Drawing Sheets

U.S. PATENT DOCUMENTS

| | | |
|---|---|---|
| 5,101,346 A | 3/1992 | Ohtsuki ........................ 395/800 |
| 5,109,486 A | 4/1992 | Seymour |
| 5,187,787 A | 2/1993 | Skeen et al. |
| 5,218,699 A | 6/1993 | Brandle et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,303,042 A | 4/1994 | Lewis et al. ................... 348/14 |
| 5,307,490 A | 4/1994 | Davidson et al. |
| 5,311,591 A | 5/1994 | Fischer .......................... 380/4 |
| 5,339,430 A | 8/1994 | Lundin et al. ............... 395/700 |
| 5,339,435 A | 8/1994 | Lubkin et al. |
| 5,386,568 A | 1/1995 | Wold et al. |
| 5,390,328 A | 2/1995 | Frey et al. |
| 5,392,280 A | 2/1995 | Zheng ........................ 370/60 |
| 5,423,042 A | 6/1995 | Jalili et al. |
| 5,440,744 A | 8/1995 | Jacobson et al. |
| 5,446,901 A | 8/1995 | Owicki et al. ............... 395/700 |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale .............. 395/184.01 |
| 5,471,629 A | 11/1995 | Risch |
| 5,475,792 A | 12/1995 | Stanford et al. |
| 5,475,817 A | 12/1995 | Waldo et al. |
| 5,481,721 A | 1/1996 | Serlet et al. |
| 5,504,921 A | 4/1996 | Dev et al. |
| 5,506,984 A | 4/1996 | Miller ........................ 395/600 |
| 5,511,197 A | 4/1996 | Hill et al. |
| 5,524,244 A | 6/1996 | Robinson et al. |
| 5,548,724 A | 8/1996 | Akizawa et al. ......... 395/200.03 |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. ................. 395/500 |
| 5,594,921 A | 1/1997 | Pettus |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. .............. 395/200.12 |
| 5,644,768 A | 7/1997 | Periwal et al. |
| 5,652,888 A | 7/1997 | Burgess |
| 5,664,191 A | 9/1997 | Davidson et al. ........... 395/670 |
| 5,671,225 A | 9/1997 | Hooper et al. |
| 5,675,796 A | 10/1997 | Hodges et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,706,435 A | 1/1998 | Barbara et al. |
| 5,706,502 A | 1/1998 | Foley et al. |
| 5,724,588 A | 3/1998 | Hill et al. |
| 5,727,145 A | 3/1998 | Nessett et al. |
| 5,737,607 A | 4/1998 | Hamilton et al. |
| 5,745,687 A | 4/1998 | Randell ........................ 709/201 |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. ............. 704/243 |
| 5,757,925 A | 5/1998 | Faybishenko |
| 5,758,077 A | 5/1998 | Danahy et al. ......... 395/200.31 |
| 5,758,344 A | 5/1998 | Prasad et al. ................. 707/10 |
| 5,761,507 A | 6/1998 | Govett ........................ 395/684 |
| 5,761,656 A | 6/1998 | Ben-Schachar |
| 5,764,897 A | 6/1998 | Khalidi |
| 5,764,915 A | 6/1998 | Heimsoth et al. ...... 395/200.57 |
| 5,768,532 A | 6/1998 | Megerian |
| 5,774,551 A | 6/1998 | Wu et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. ........ 395/200.31 |
| 5,787,425 A | 7/1998 | Bigus |
| 5,787,431 A | 7/1998 | Shaughnessy |
| 5,799,173 A | 8/1998 | Gossler et al. .............. 395/500 |
| 5,802,367 A | 9/1998 | Held et al. |
| 5,806,042 A | 9/1998 | Kelly et al. ..................... 705/4 |
| 5,808,911 A | 9/1998 | Tucker et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. .... 395/200.51 |
| 5,845,129 A | 12/1998 | Wendorf et al. ............ 710/200 |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,873,099 A | 2/1999 | Hogan et al. ................ 707/204 |
| 5,875,335 A | 2/1999 | Beard |
| 5,878,411 A | 3/1999 | Burroughs et al. |
| 5,884,079 A | 3/1999 | Furusawa |
| 5,887,134 A | 3/1999 | Ebrahim |
| 5,889,951 A | 3/1999 | Lombardi |
| 5,890,158 A | 3/1999 | House et al. |
| 5,892,904 A | 4/1999 | Atkinson et al. ............ 713/201 |
| 5,913,029 A | 6/1999 | Shostak ................. 395/200.33 |
| 5,933,497 A | 8/1999 | Beetcher et al. |
| 5,933,647 A | 8/1999 | Aronberg et al. ............ 395/712 |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. .............. 395/701 |
| 5,951,652 A | 9/1999 | Ingrassia, Jr. et al. ...... 709/248 |
| 5,956,509 A | 9/1999 | Kevner |
| 5,963,947 A | 10/1999 | Ford et al. ..................... 707/10 |
| 5,966,531 A | 10/1999 | Skeen et al. |
| 5,969,967 A | 10/1999 | Aahlad et al. |
| 5,974,201 A | 10/1999 | Chang et al. ................ 382/305 |
| 5,978,484 A | 11/1999 | Apperson et al. ............. 380/25 |
| 5,987,506 A | 11/1999 | Carter et al. |
| 5,991,808 A | 11/1999 | Broder et al. ................ 709/226 |
| 5,996,075 A | 11/1999 | Matena ........................ 395/186 |
| 5,999,179 A | 12/1999 | Kekic et al. |
| 5,999,988 A | 12/1999 | Pelegri-Liopart et al. ... 709/304 |
| 6,003,763 A | 12/1999 | Gallagher et al. |
| 6,009,464 A | 12/1999 | Hamilton et al. ............ 709/219 |
| 6,016,496 A | 1/2000 | Roberson |
| 6,018,619 A | 1/2000 | Allard et al. ............ 395/200.54 |
| 6,023,586 A | 2/2000 | Gaisford et al. ............. 395/712 |
| 6,026,414 A | 2/2000 | Anglin |

| | | | |
|---|---|---|---|
| 6,031,977 A | 2/2000 | Pettus | |
| 6,034,925 A | 3/2000 | Wehmeyer | 369/30 |
| 6,052,724 A | 4/2000 | Willie et al. | 709/223 |
| 6,052,761 A | 4/2000 | Hormung et al. | 711/141 |
| 6,055,562 A | 4/2000 | Devarakonda et al. | 709/202 |
| 6,058,381 A | 5/2000 | Nelson | 705/40 |
| 6,058,383 A | 5/2000 | Narasimbalu et al. | 705/44 |
| 6,061,699 A | 5/2000 | DiCecco et al. | |
| 6,061,713 A | 5/2000 | Bharadhwaj | |
| 6,067,575 A | 5/2000 | McManis et al. | 709/300 |
| 6,078,655 A | 6/2000 | Fahrer et al. | 379/209 |
| 6,085,255 A | 7/2000 | Vincent et al. | 709/238 |
| 6,092,194 A | 7/2000 | Touboul | 713/200 |
| 6,104,716 A | 8/2000 | Crichton et al. | 370/401 |
| 6,108,346 A | 8/2000 | Doucette et al. | 370/450 |
| 6,154,844 A | 11/2000 | Touboul et al. | 713/201 |
| 6,157,960 A | 12/2000 | Kaminsky et al. | 709/303 |
| 6,167,449 A | 12/2000 | Arnold et al. | 709/227 |
| 6,185,602 B1 | 2/2001 | Bayrakeri | 709/204 |
| 6,185,611 B1 | 2/2001 | Waldo et al. | 709/221 |
| 6,189,046 B1 | 2/2001 | Moore et al. | 709/315 |
| 6,192,044 B1 | 2/2001 | Mack | 370/352 |
| 6,199,068 B1 | 3/2001 | Carpenter | 707/100 |
| 6,212,578 B1 | 4/2001 | Racicot et al. | 709/330 |
| 6,216,138 B1 | 4/2001 | Wells et al. | 707/502 |
| 6,219,675 B1 | 4/2001 | Pal et al. | 707/201 |
| 6,226,746 B1 | 5/2001 | Scheifler | 713/200 |
| 6,243,814 B1 | 6/2001 | Matena | 713/200 |
| 6,247,091 B1 | 6/2001 | Lovett | 710/260 |
| 6,282,295 B1 | 8/2001 | Young et al. | 380/286 |
| 6,282,568 B1 | 8/2001 | Sondur et al. | 709/223 |
| 6,282,581 B1 | 8/2001 | Moore et al. | 709/316 |
| 6,292,934 B1 | 9/2001 | Davidson et al. | 717/4 |
| 6,301,613 B1 | 10/2001 | Ahlstrom et al. | 709/223 |
| 6,408,342 B1 | 6/2002 | Moore et al. | 709/330 |
| 6,418,468 B1 | 7/2002 | Ahlstrom et al. | 709/223 |
| 6,578,074 B1 | 6/2003 | Bahlmann | 709/220 |
| 6,604,127 B2 | 8/2003 | Murphy et al. | 709/203 |
| 6,604,140 B1 | 8/2003 | Beck et al. | 709/226 |
| 6,654,793 B1 | 11/2003 | Wollrath et al. | 709/217 |

FOREIGN PATENT DOCUMENTS

| | | |
|---|---|---|
| EP | 497 022 A1 | 8/1992 |
| EP | 0 555 997 A | 8/1993 |
| EP | 0 565 849 A | 10/1993 |
| EP | 0 569 195 A2 | 11/1993 |
| EP | 0 625 750 A | 11/1994 |
| EP | 0 635 792 A | 1/1995 |
| EP | 0 651 328 A | 5/1995 |
| EP | 0 660 231 A | 6/1995 |
| EP | 0 718 761 A | 12/1995 |
| EP | 0 697 655 A2 | 2/1996 |
| EP | 0 718 761 A1 | 6/1996 |
| EP | 0 767 432 A2 | 4/1997 |
| EP | 0 810 524 A | 5/1997 |
| EP | 0 778 520 A2 | 6/1997 |
| EP | 0 794 493 A2 | 9/1997 |
| EP | 0 803 810 A2 | 10/1997 |
| EP | 0 803 811 A | 10/1997 |
| EP | 0 805 393 A2 | 11/1997 |
| EP | 0 810 524 A1 | 12/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 2 305 087 A | 3/1997 |
| WO | WO98/02814 | 1/1998 |
| WO | WO98/04971 | 2/1998 |
| WO | WO 00/17194 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

Jennings, N. R. et al., "Using Intelligent Agents to Manage Business Processes," Department Electronic Engineering, Queen Mary & Westfield College, XP002254546, 1996, pp. 345–360.

"Java™ Object Serialization Specification," Sun Microsystems, Inc., XP–002242372, Revision 1.43, JDK™ 1.2, 1998.

"Java.io ObjectInputStream", XP–002243027, 1998, p. 1230–1232, 1263–1264 & 1283.

Opyrchal et al., "Efficient Object Serilization in Jave," Department of Electrical Engineering and Computer Science, University of Michigan, XP–002242373, 1999.

Amitabh, et al., "Proxies, Application Interfaces, and Distributed Systems," 1992, IEEE, pp. 212–220.

Riggs et al., "Pickling State in the Java™ System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Wollrath et al., "A Distributed Model for the Java™ System," USENIX Association, Conference on Object–Oriented Technologies and Systems, Jun. 17–21, 1996.

"Java™ Remote Method Invocation Specification," Sun Microsystems, Inc., 1997.

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Aldrich et al., "Providing Easier Access to Remote Objects in Client–Server Systems," System Sciences, 1998, Proceedings, of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Anderson et al., "Persistent Linda: Linda + Transactions + Query Processing," Proceedings of the 13th Symposium on Fault Tolerant Systems, pp. 93–109, 1991.

Birrell et al., "Distributed Garbage Collection for Network Objects," Digital Systems Research Center, No. 116, pp. 1–18, Dec. 15, 1993.

Birrell et al., "Grapevine: An Exercise in Distributed Computing," Communications of the ACM, vol. 25, No. 4, pp. 260–274, Apr. 1982.

Birrell et al., "Implementing Remote Procedure Calls," ACM Transactions on Computer Systems, vol. 2, No. 1, pp. 39–59, Feb. 1984.

Birrell et al., "Network Objects," DEC SRC Research Report 115, Feb. 28, 1994.

Birrell et al., "Networks Objects," Operating Systems Review, 27(5), pp. 217–230, Dec. 1993.

Burns et al., "An Analytical Study of Opportunistic Lease Renewal," Distributed Computing Systems, 21st International Conference, pp. 146–153, Apr. 2000.

Cannon et al., "Adding Fault–Tolerant Transaction Processing to Linda," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed Data Structures in Linda," Principles of–Programming Language, pp. 1–16, 1986.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publications, Inc., Sep. 1978.

Chung et al., "A 'Tiny' Pascal Compiler: Part 2: The P–Compiler," BYTE Publications, Inc., Oct. 1978.

Coutouris et al., "Distributed Systems Concepts and Designs," Second Edition, Addison–Wesley, 1994.

Dijkstra, "Self–stabilizing Systems in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dollimore et al., "The Design of a System for Distributing Shared Objects," The Computer Journal, No. 6, Cambridge, GB, Dec. 1991.

Dourish, "A Divergence–Based Model of Synchrony and Distribution in Collaborative Systems," Xerox Technical Report EPC–1194–102, pp. 1–10, 1994.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gelernter et al., "Parallel Programming in Linda," Yale University, pp. 1–21, Jan. 1985.

Gelernter, "Generative Communication in Linda," ACM Transactions on Programming Languages and Systems, vol. 7, No. 1, pp. 80–112, Jan. 1985.

Gray et al., "Leases: An Efficient Fault–Tolerant Mechanism for Distributed File Cache Consistency," Proceedings of the 12th ACM Symposium on Operating Systems Principles, pp. 202–210, 1989.

Guth, "JavaOne: Sun to Expand Java Distributed Computing Effort," <http://www.sunworld.com/swol–02–1998/swol–02–sunspots.html>, XP–002109935, p. 1. Feb. 20, 1998.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hamilton, "Java and the Shift to the Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hoshi et al., "Allocation of the Cross–Connect Function in Leased Circuit Networks," 1992, ICC'92, conference record, SuperComm/ICC '02, D a New World of Communications, IEEE International Conference, pp. 1408–1412.

Howard et al., "Scale and Performance in a Distributed File System," ACM Transactions on Computer Systems, vol. 6, No. 1, pp. 51–81, Feb. 1988.

IBM Technical Disclosure Bulletin, "Local Network Monitoring to Populate Access Agent Directory," vol. 36, No. 09A, pp. 403–405, Sep. 1993.

Jaworski, "Java 1.1 Developer's Guide, 2nd Edition," Sams.net, 1997.

Jones et al., "Garbage Collection: Algorithms for Automatic Dynamic Memory Management," pp. 165–175, John Wiley & Sons, 1996.

Kambhatia et al., "Recovery with Limited Replay: Fault–Tolerant Processes in Linda," Oregon Graduate Institute, Technical Report CSIE 90–019, pp. 1–16, Sep. 1990.

Krasner, "The Smalltalk–80 Virtual Machine," BYTE Publications, Inc., pp. 300–320, Aug. 1991.

Lamport et al., "The Byzantine Generals Problem," ACM Transactions on Programming Languages and Systems, vol. 4, No. 3, pp. 382–401, Jul. 1982.

Linda Database Search, pp. 1–68, Jul. 20, 1995.

Lindholm et al., "The Java™ Virtual Machine Specification," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Mitchell et al., "Mesa Language Manual," Xerox Corporation, Palo Alto Research Center, 1978.

Mullender, "Distributed Systems," Second Edition, Addison–Wesley, 1993.

Mummert et al., "Long Term Distributed File Reference Tracing: Implementation and Experience," Carnegie Mellon University School of Computer Science, pp. 1–28, Nov. 1994.

MUX–Elektronik, Java 1.1 Interactive Course, www.lls.se/–mux/javaic.html, 1995.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Stevenson, "Token–Based Consistency of Replicated Servers," IEEE, CH2686–4/89/0000/0179, pp. 179–183 1989.

Thompson, "Regular Expression Search Algorithm," Communications of the ACM, vol. II, No. 6, p. 149 et seq., Jun. 1968.

Yin et al., "Volume Leases for Consistency in Large–Scale Systems," IEEE Transactions on Knowledge & Data Engineering, vol. 11, No. 4, pp. 563–576, Jul./Aug. 1999.

Alexander, et al., "Active Bridging," Proceedings of the ACM/SIGCOMM'97 Conference, Cannes, France, Sep. 97.

Anonymous: "Change–Notification Service for Shared Files," IBM Technical Disclosure Bulletin, vol. 36, No. 8, pp. 77–82, XP002108713 New York, US.

Anonymous: "Resource Preemption for Priority Scheduling," Nov. 1973, IBM Technical Disclosure Bulletin, vol. 16, No. 6, p. 1931 XP002109435 New York US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Belz, Mark; "Interoperable objects: laying the foundation for distributed object computing"; Dr. Dobb's Journal, vol. 19, No. 11, p. 18(13); (Oct. 1994).

Bevan, D. I., "An Efficient Reference Counting Solution To The Distributed Garbage Collection Problem," Parall Computing, NL, Elsevier Publishers, Amsterdam, vol. 9, No. 2, pp. 179–192.

Dave A. et al: "Proxies, Application Interface, and Distributed Systems," Proceedings International Workshop on Object Orientation in Operating Systems, Sep. 24, 1992, pp. 212–220.

Deux O. et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 31–266.

Droms, R., "RFC 1541 Dynamic Host Configuration Protocol," HTTP://WWW.CIS.OHIO–STATE.EDU/HTBIN/RFC/RFC/1541.HTML, Oct. 1993, pp. 1–33.

Emms, J: "A Definition of an Access Control Systems Language," Computer Standards and Interfaces, vol. 6, No. 4, Jan. 1, 1987, pp. 443–454.

Gosling et al., "The Java™ Language Specification," Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort," HTTP://WWW.SUNWORLD.COM/SWOL–02–1998/SWOL–02–SUNSPOTS.HTML, XP–002109935, p. 1, 1998.

Hamilton et al., "Subcontract: a flexible base for distributed programming," Proceedings of the 14th Symposium of Operating System Principles; (Dec. 1993).

Hartman, J., Manber, U., et al., "Liquid Software: A new paradigm for networked systems," Technical Report 96–11, Department of Comp. Sci., Univ. of Arizona, Jun. 1996.

Hunt, N., "IDF: A Graphical Data Flow Programming Language for Image Processing and Computer Vision," Proceedings of the International Conference on Systems, Man, and Cybernetics, Los Angeles, Nov. 4–7, pp. 351–360, (1990).

IBM™ Technical Disclosure Bulletin, "Object Location Algorithm," vol. 36, No. 09B, pp. 257–258, Sep. 1993.

IBM™ Technical Disclosure Bulletin, "Retrieval of Qualified Variables Using Extendible Hashing," vol. 36, No. 12, pp. 301–303, Dec. 1993.

IBM: "Chapter 6–Distributed SOM (DSOM)" Somobjects Developer Toolkit Users Guide, Version 2.1, Oct. 1994, pp. 6–1–6–90.

Kay, Michael H. et al., "An Overview of the Raleigh Object–Oriented Database System," ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Mitchell et al.; "An Overview of the Spring System," (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java™ System," USENIX Association Conference on Object–Oriented Technologies and Systems, XP–002112719, Jun. 17–21, 1996, pp. 241–250.

Venners, B., "Jini Technology, Out of the Box," Java–World, Online!, pp. 1–4, Dec. 1998.

Waldo J et al: "Events in an RPC based distributed system," Proceedings of the 1995 USENIX Technical Conference, Proceedings USENIX Winter 1995 Technical Conference, New Orleans, LA. USA, Jan. 16–20, 1995, pp. 131–142.

Wilson, P. R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks," IFIP/IEEE International Workshop on Distributed Systems: Operations and Management, L'Aquila, Italy, Oct. 1996.

Yin J. et al., "Using Leases to Support Server Driven Consistency in Large–Scale Systems," Computer Services Department, University of Texas at Austin, pp. 285–294, May 1998.

Wollrath et al., "Java–Centric Distributed Computing," IEEE Micro, pp. 44–53, 1997.

POLICY FILE 4100

| PERMISSION | EXECUTOR1 | FILE://SOMESOURCE | SOMEKEY | WRITE | /TMP/* |
| PERMISSION | EXECUTOR2 | FILE://OTHERSOURCE | OTHERKEY | WRITE | /TMP/* |

| PERMISSION | EXECUTORN | HTTP://WWW.SOURCE.COM | LASTKEY | WRITE | /TMP/* |

FIG. 5

STACK-BASED ACCESS CONTROL USING CODE AND EXECUTOR IDENTIFIERS

RELATED APPLICATIONS

This application is a continuation of U.S. patent application Ser. No. 09/537,746, filed Mar. 30, 2000, now U.S. Pat. No. 6,389,540, which is a continuation of U.S. patent application Ser. No. 09/044,915, filed Mar. 20, 1998, now U.S. Pat. No. 6,138,238, which is a continuation-in-part of U.S. patent application Ser. No. 08/988,431, filed Dec. 11, 1997, now U.S. Pat. No. 6,192,476, and also claims the benefit of U.S. Provisional Application No. 60/076,048, filed Feb. 26, 1998, all of which are incorporated herein by reference.

U.S. patent application entitled "Layer-Independent Security for Communication Channels," filed on Jun. 26, 1997, and accorded Ser. No. 08/883,636.

Provisional U.S. patent application Ser. No. 60/076,048, entitled "Distributed Computing System" filed on Feb. 26, 1998.

U.S. patent application Ser. No. 09/044,923, entitled "Method and System for Leasing Storage," and filed on the same date herewith.

U.S. patent application Ser. No. 08/044,838, entitled "Method, Apparatus, and Product for Leasing of Delegation Certificates in a Distributed System," and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," bearing attorney docket no. 06502.0011-04000, and filed on the same date herewith.

U.S. patent application Ser. No. 09/044,933, entitled "Method for Transporting Behavior in Event Based System," and filed on the same date herewith.

U.S. patent application Ser. No. 09/044,919, entitled "Deferred Reconstruction of Objects and Remote Loading for Event Notification in a Distributed System," and filed on the same date herewith.

U.S. patent application Ser. No. 09/044,938, entitled "Methods and Apparatus for Remote Method Invocation," and filed on the same date herewith.

U.S. patent application Ser. No. 09/044,652, entitled "Method and System for Deterministic Hashes to Identify Remote Methods," and filed on the same date herewith.

U.S. patent application Ser. No. 09/044,790, entitled "Method and Apparatus for Determining Status of Remote Objects in a Distributed System," and filed on the same date herewith.

U.S. patent application Ser. No. 09/044,930, entitled "Downloadable Smart Proxies for Performing Processing Associated with a Remote Procedure Call in a Distributed System" and filed on the same date herewith.

U.S. patent application Ser. No. 09/044,917, entitled "Suspension and Continuation of Remote Methods," and filed on the same date herewith.

U.S. patent application Ser. No. 09/044,835, entitled "Method and System for Multi-Entry and Multi-Template Matching in a Database," and filed on the same date herewith.

U.S. patent application Ser. No. 09/044,839, entitled "Method and System for In-Place Modifications in a Database," and filed on the same date herewith.

U.S. patent application Ser. No. 09/044,945, entitled "Method and System for Typesafe Attribute Matching in a Database," and filed on the same date herewith.

U.S. patent application Ser. No. 09/044,931, entitled "Dynamic Lookup Service in a Distributed System," and filed on the same date herewith.

U.S. patent application Ser. No. 09/044,939, entitled "Apparatus and Method for Providing Downloadable Code for Use in Communicating with a Device in a Distributed System." and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/030,840, entitled "Method and Apparatus for Dynamic Distributed Computing Over a Network" and filed on Feb. 26, 1998.

U.S. patent application Ser. No. 09/044,936, entitled "An Interactive Design Tool for Persistent Shared Memory Spaces" and filed on the same date herewith.

U.S. patent application Ser. No. 09/044,934, entitled "Polymorphic Token-Based Control," and filed on the same date herewith.

U.S. patent application Ser. No. 09/044,944, entitled "Stack-Based Security Requirements," and filed on the same date herewith.

U.S. patent application Ser. No. 09/044,837, entitled "Per-Method Designation of Security Requirements," and filed on the same date herewith.

BACKGROUND OF THE INVENTION

The present invention is directed to security measures in a computer system and, more particularly, to systems and methods that control access to a resource based on the source of the code and the identity of the principal on whose behalf the code is being executed.

As the use of computer systems grows, organizations are becoming increasingly reliant upon them. A malfunction in the computer system can severely hamper the operation of such organizations. Thus, organizations that use computer systems are vulnerable to users who may intentionally or unintentionally cause the computer system to malfunction.

One way to compromise the security of a computer system is to cause the computer system to execute software that performs harmful actions on the computer.system. There are various types of security measures that may be used to prevent a computer system from executing harmful software. One example is to check all software executed by the computer system with a "virus" checker. However, virus checkers only search for very specific software instructions. Therefore, many software-tampering mechanisms go undetected by a virus checker.

Another very common measure used to prevent the execution of software that tampers with a computer's resources is the "trusted developers approach." According to the trusted developers approach, system administrators limit the software that a computer system can access to only software developed by trusted software developers. Such trusted developers may include, for example, well known vendors or in-house developers.

Fundamental to the trusted developers approach is the idea that computer programs are created by developers, and that some developers can be trusted to produce software that does not compromise security. Also fundamental to the trusted developers approach is the notion that a computer system executes only programs that are stored at locations that are under control of the system administrators.

Recently developed methods of running applications involve the automatic and immediate execution of software code loaded from remote sources over a network. When the network includes remote sources that are outside the control of system administrators, the trusted developers approach does not work.

One conventional attempt to adapt the trusted developers approach to systems that can execute code from remote sources is referred to as the trusted source approach. An important concept of the trusted source approach is the notion that the location from which a program is received (i.e., the "source" of the program) identifies the developer of the program. Consequently, the source of the program may be used to determine whether the program is from a trusted developer. If the source is associated with a trusted developer, then the source is considered to be a "trusted source" and execution of the code is allowed.

One implementation of the trusted source approach is referred to as the sand box method. The sand box method allows all code to be executed, but places restrictions on remote code. Specifically, the sand box method permits all trusted code full access to a computer system's resources and all remote code limited access to the resources. Trusted code is usually stored locally on the computer system under the direct control of the owners or administrators of the computer system, who are accountable for the security of the trusted code.

One drawback of the sand box approach is that the approach is not very flexible because it restricts access by remote code to the same limited set of resources. Conflicts can then arise when remote code from several sources attempt to access the same resources. As a result, conventional systems often limit access by remote code from one source to one set of computer resources, while limiting access by remote code from another source to a different set of computer resources. For example, a system may limit access by remote code loaded over a network from a source associated with a first computer to one set of files, and similarly limit access by remote code loaded over the network from a source associated with a second computer to another set of files.

Providing security measures that allow more flexibility than the sand box method involves establishing a complex set of relationships between principals and permissions. A "principal" is an entity in the computer system to which permissions are granted. Examples of principals include users, organizations, processes, objects, and threads. A "permission" is an authorization by the computer system that allows a principal to perform a particular action or function.

The task of assigning permissions to principals is complicated by the fact that sophisticated processes may involve the interaction of code from multiple sources. For example, code from a trusted first source being executed by a principal (e.g., a thread) may cause the execution of code from a trusted second source, and then cause execution of code from an untrusted third source.

Even though the principal remains the same when the code from the trusted second source and code from the untrusted third source are executed, the access privileges appropriate for the principal when code from the trusted second source is executed likely differ from access privileges appropriate for the principal when the code from the untrusted third source is being executed. Thus, access privileges appropriate for a principal may change dynamically as the source of the code being executed by the principal changes.

Access privileges may also change dynamically as the principal on whose behalf the code is being executed changes. Sometimes one principal executes code on behalf of another principal. For example, when a principal on one computer requests access to a resource on a remote computer, the request causes a "remote" principal to be invoked on the remote computer to handle the request. Handling of the request by the remote principal may involve the execution of code from trusted and untrusted sources. In these situations, conventional systems continue to base code access privileges on the source of the code without regard to the principal on whose behalf the code is executed. By failing to consider the principal on whose behalf the code is being executed, conventional systems ignore a possible breach in security.

Based on the foregoing, it is clearly desirable to develop a security mechanism that determines the appropriate code access privileges.

SUMMARY OF THE INVENTION

Systems and methods consistent with the principles of the present invention address this need by determining access control to code based on the source of the code and the principal on whose behalf the code is being executed. By regulating code access based on either or both of these factors, the security in computer systems can be enhanced.

A system consistent with the principles of the present invention regulates access to resources requested by an operation executing on a computer. The operation invokes a plurality of methods that operate upon code during execution. The system includes a policy file, a call stack, and an execution unit. The policy file stores permissions for the resource. The permissions authorize particular types of access to the resource based on a source of the code and an executor of the code. The call stack stores representations of the methods and executors in an order of invocation by the operation. The execution unit grants access to the resource when the types of access authorized by the permissions of all of the methods and executors on the call stack encompass the access requested by the operation.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings:

FIG. 5 is a diagram of an exemplary policy implemented through use of the policy file of FIG. 4;

DETAILED DESCRIPTION

Figure 1:
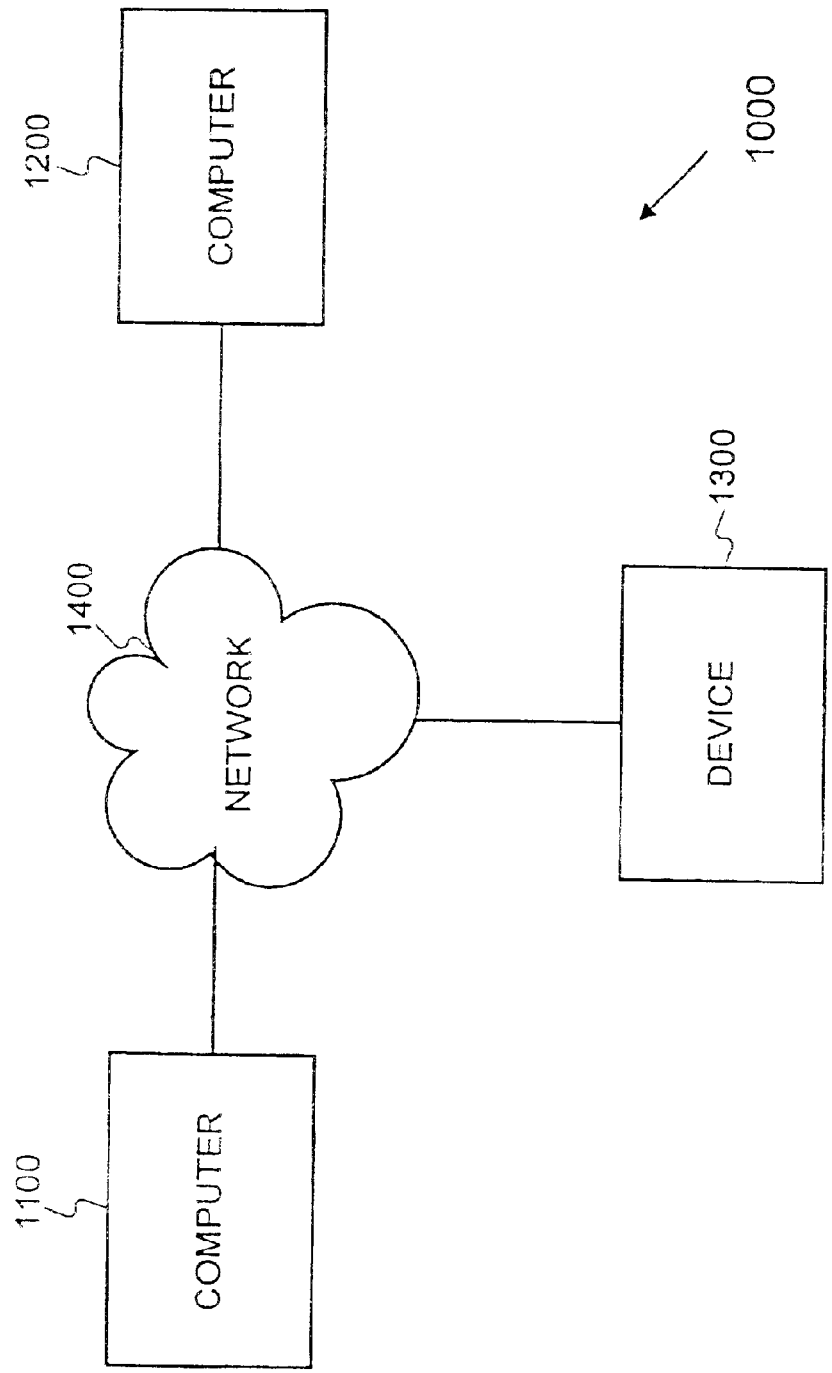
FIG. 1 is a diagram of a computer network consistent with the principles of the present invention.

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention increase security by providing flexible designation of access privileges to code. The systems and methods not only base the access privileges on the source of the code (i.e., whether the code is trusted or untrusted), but also on the identity of the principal on whose behalf the code is being executed (i.e., whether the principal requesting the code execution is trusted or untrusted).

Overview of the Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, *Java 1.1 Developer's Guide*, Sams.net, 1997, which is incorporated herein by reference.

In the exemplary distributed system, different computers and devices are federated into what appears to the user to be a single system. By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

FIG. 1 depicts the exemplary distributed system 1000 containing a computer 1100, a computer 1200, and a device 1300 interconnected by a network 1400. The computers 1100 and 1200 may include any conventional computers, such as IBM-compatible computers, or even "dumb" terminals. During typical operation, computers 1100 and 1200 may establish a client-server relationship to transmit and retrieve data.

The device 1300 may be any of a number of devices, such as a printer, fax machine, storage device, computer, or other devices. The network 1400 may be a local area network, wide area network, or the Internet. Although only two computers and one device are depicted as comprising the exemplary distributed system 1000, one skilled in the art will appreciate that the exemplary distributed system 1000 may include additional computers or devices.

Figure 2:
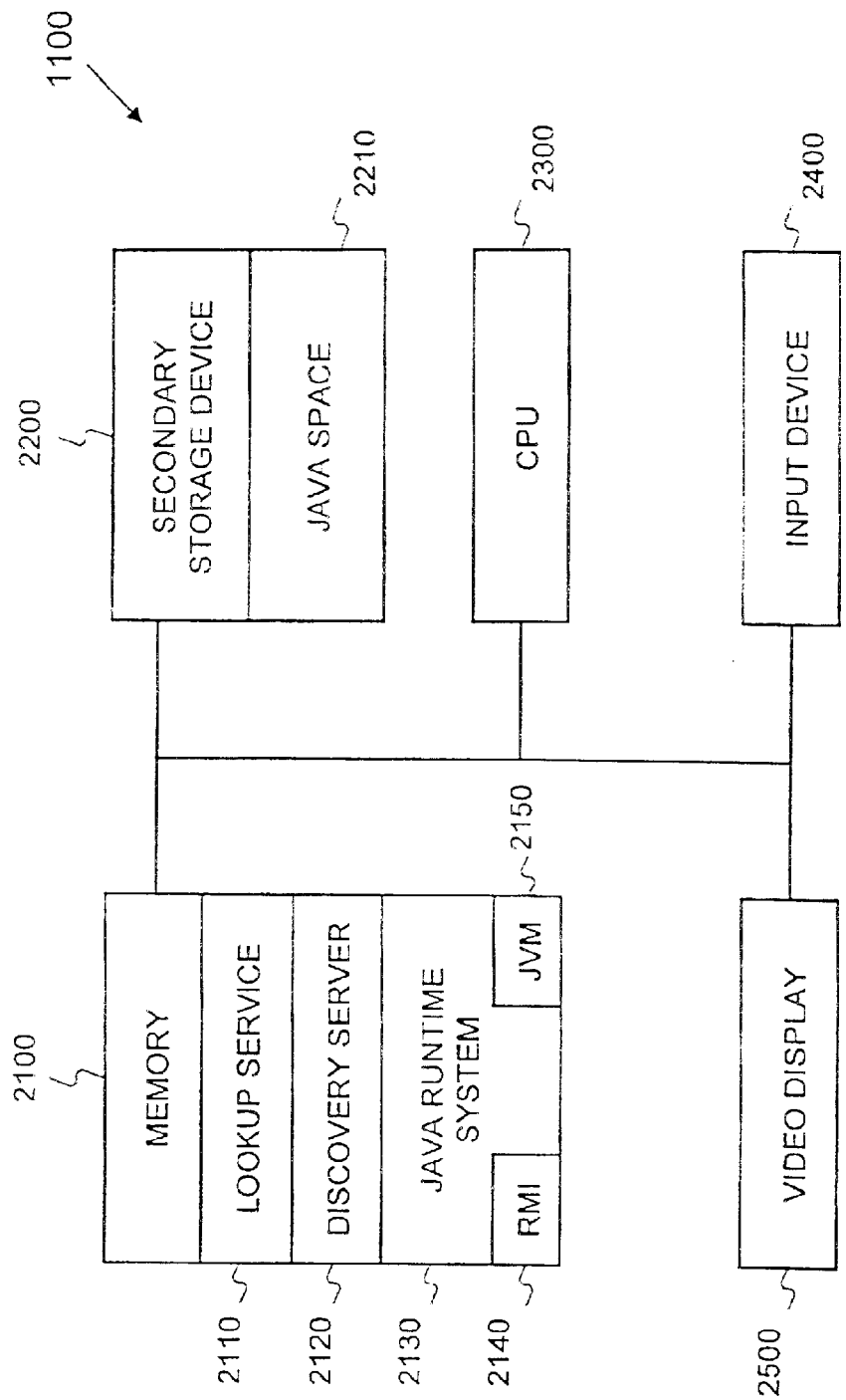
FIG. 2 is a diagram of a computer of FIG. 1 in an implementation consistent with the principles of the present invention.

FIG. 2 depicts the computer 1100 in greater detail to show a number of the software components of the exemplary distributed system 1000. One skilled in the art will appreciate that computer 1200 or device 1300 may be similarly configured. Computer 1100 includes a memory 2100, a secondary storage device 2200, a central processing unit (CPU) 2300, an input device 2400, and a video display 2500. The memory 2100 includes a lookup service 2110, a discovery server 2120, and a Java™ runtime system 2130. The Java runtime system 2130 includes the Java™ remote method invocation system (RMI) 2140 and a Java™ virtual machine (JVM) 2150. The secondary storage device 2200 includes a Java™ space 2210.

As mentioned above, the exemplary distributed system 1000 is based on the Java programming environment and thus makes use of the Java runtime system 2130. The Java runtime system 2130 includes the Java™ application programming interface (API), allowing programs running on top of the Java runtime system to access, in a platform-independent manner, various system functions, including windowing capabilities and networking capabilities of the host operating system. Since the Java API provides a single common API across all operating systems to which the Java runtime system 2130 is ported, the programs running on top of a Java runtime system run in a platform-independent manner, regardless of the operating system or hardware configuration of the host platform. The Java runtime system 2130 is provided as part of the Java™ software development kit available from Sun Microsystems of Mountain View, Calif.

The JVM 2150 also facilitates platform independence. The JVM 2150 acts like an abstract computing machine, receiving instructions from programs in the form of byte codes and interpreting these byte codes by dynamically converting them into a form for execution, such as object code, and executing them. RMI 2140 facilitates remote method invocation by allowing objects executing on one computer or device to invoke methods of an object on another computer or device. The RMI may be located within the JVM, and both the RMI and the JVM are provided as part of the Java software development kit.

The lookup service 2110 defines the services that are available for a particular Djinn. That is, there may be more than one Djinn and, consequently, more than one lookup service within the exemplary distributed system 1000. The lookup service 2110 contains one object for each service within the Djinn, and each object contains various methods that facilitate access to the corresponding service. The lookup service 2110 and its access are described in greater detail in co-pending U.S. patent application Ser. No. 09/044,837, entitled "Method and System for Facilitating Access to a Lookup Service," which has previously been incorporated by reference.

The discovery server 2120 detects when a new device is added to the exemplary distributed system 1000 during a process known as boot and join or discovery, and when such a new device is detected, the discovery server passes a reference to the lookup service 2110 to the new device, so that the new device may register its services with the lookup service and become a member of the Djinn. After registration, the new device becomes a member of the Djinn, and as a result, it may access all the services contained in the lookup service 2110. The process of boot and join is described in greater detail in co-pending U.S. patent application Ser. No. 09/044,939, entitled "Apparatus and Method for providing Downloadable Code for Use in Communicating with a Device in a Distributed System," which has previously been incorporated by reference.

The Java space 2210 is an object repository used by programs within the exemplary distributed system 1000 to store objects. Programs use the Java space 2210 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 1000 may contain many lookup services, discovery servers, and Java spaces.

Functional Overview

A security enforcement mechanism is provided in which the access permissions of a thread are allowed to vary over time based on the source and executor of the code currently being executed. The source of the code indicates whether the code is from a trusted or untrusted source. The executor indicates the principal on whose behalf the code is being executed. For example, the executor may be a particular user or a particular organization on whose behalf the process or program is operating on a client computer.

When a routine that arrives from a trusted source is executing, the thread executing the routine is typically allowed greater access to resources. Similarly, a trusted executor may be given greater access to resources.

When a routine calls another routine, the thread executing the routines is associated with permissions common to both routines. Thus, the thread is restricted to a level of access that is less than or equal to the level of access allowed for either routine.

The mechanism allows certain routines to be "privileged." When determining whether a thread is able to perform an action, only the permissions associated with the privileged routine and the routines above the privileged routine in the calling hierarchy of the thread are inspected.

According to an implementation consistent with the present invention, the security mechanism described herein uses permission objects and protection domain objects to store information that models the security policy of a system. The nature and use of these objects, as well as the techniques for dynamically determining the time-variant access privileges of a thread, are described hereafter in greater detail.

Trusted and Untrusted Sources

Figure 3:
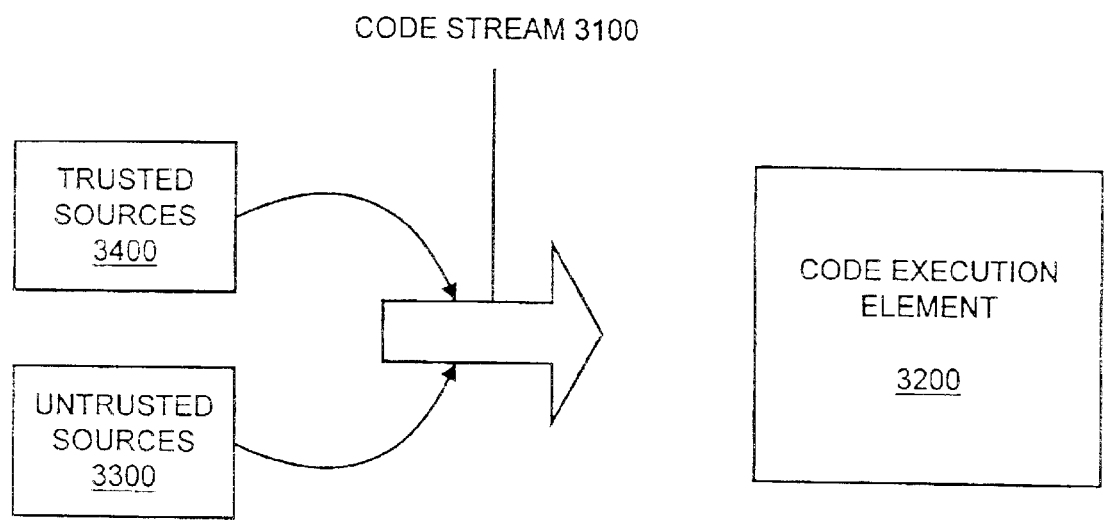
FIG. 3 is a diagram of a code stream executing in the computer of FIG. 2.

FIG. 3 is a diagram of a code stream 3100 executing in computer 1100 (FIG. 2). The code stream 3100 is executed by a code execution element 3200, such as JVM 2150, and may derive from zero or more untrusted sources 3300 or zero or more trusted sources 3400. Untrusted sources 3300 and trusted sources 3400 may be file servers, including file servers connected to the Internet, or other similar devices. An untrusted source is typically not under the direct control of the operator of computer 1100. Code from untrusted sources is herein referred to as untrusted code.

Because untrusted code is considered to pose a high security risk, the set of computer resources that untrusted code may access is usually restricted to those which do not pose security threats. Code from a trusted source is code usually developed by trusted developers. Trusted code is considered to be reliable and poses much less security risk than untrusted code.

Software code which is loaded over the network from a remote source and immediately executed is herein referred to as remote code. Typically, a remote source is a computer system of a separate organization or individual. The remote source is often connected to the Internet.

Normally untrusted code is remote code. However, code from sources local to computer 1100 may pose a high security risk. Code from such local sources may be deemed to be untrusted code from an untrusted source. Likewise, code from a particular remote source may be considered to be reliable and to pose relatively little risk, and thus may be deemed to be trusted code from a trusted resource.

According to an implementation consistent with the present invention, a security mechanism is used to implement security policies that allow trusted code to access more resources than untrusted code, even when the trusted and untrusted code are executed by the same principal. A security policy determines what actions code execution element 3200 will allow the code within code stream 3100 to perform. The use of permissions and protection domains allows policies that go beyond a simple trusted/untrusted dichotomy by allowing relatively complex permission groupings and relationships.

Protection domains and policies that may be used in conjunction with typed permissions will be described in greater detail with reference to FIG. 4.

Trusted and Untrusted Executors

The user or organization on whose behalf a computer program is operating (or in some circumstances, the program itself) is known as the "executor" (i.e., the principal on whose behalf resources will be accessed). The executor for a program on the computer 1200 (a "client executor"), for example, may be different than the executor for a program on the computer 1100 (a "server executor").

Code execution element 3200 receives the request on behalf of a client executor via the RMI 2140 (FIG. 2). In response, code execution element 3200 executes an operation, such as a thread, to handle the request. The thread is responsible for obtaining the appropriate code and/or resources to satisfy the request, and the thread will, in general, be permitted to operate on behalf of either or both of the server executor and the client executor.

Code execution element 3200 permits authorized executors, or "trusted executors," greater access to computer resources because the trusted executors are not considered to pose a high security risk. Trusted executors may include system operators that need greater access to the computer resources to handle system updates and the like. Unauthorized executors, or "untrusted executors," are treated differently. Untrusted executors are considered to pose a high security risk and, therefore, are given limited access to the computer resources.

According to an implementation consistent with the present invention, a security mechanism is used to implement security policies that allow trusted executors to access more resources than untrusted executors, even when the trusted and untrusted executors request code from a single source. A security policy determines what actions code execution element 3200 will allow. The use of permissions and protection domains allows policies that go beyond a simple trusted/untrusted dichotomy by allowing relatively complex permission groupings and relationships.

Protection domains and policies that may be used in conjunction with typed permissions shall now be described in greater detail with reference to FIG. 4.

Exemplary Security Mechanism

Figure 4:
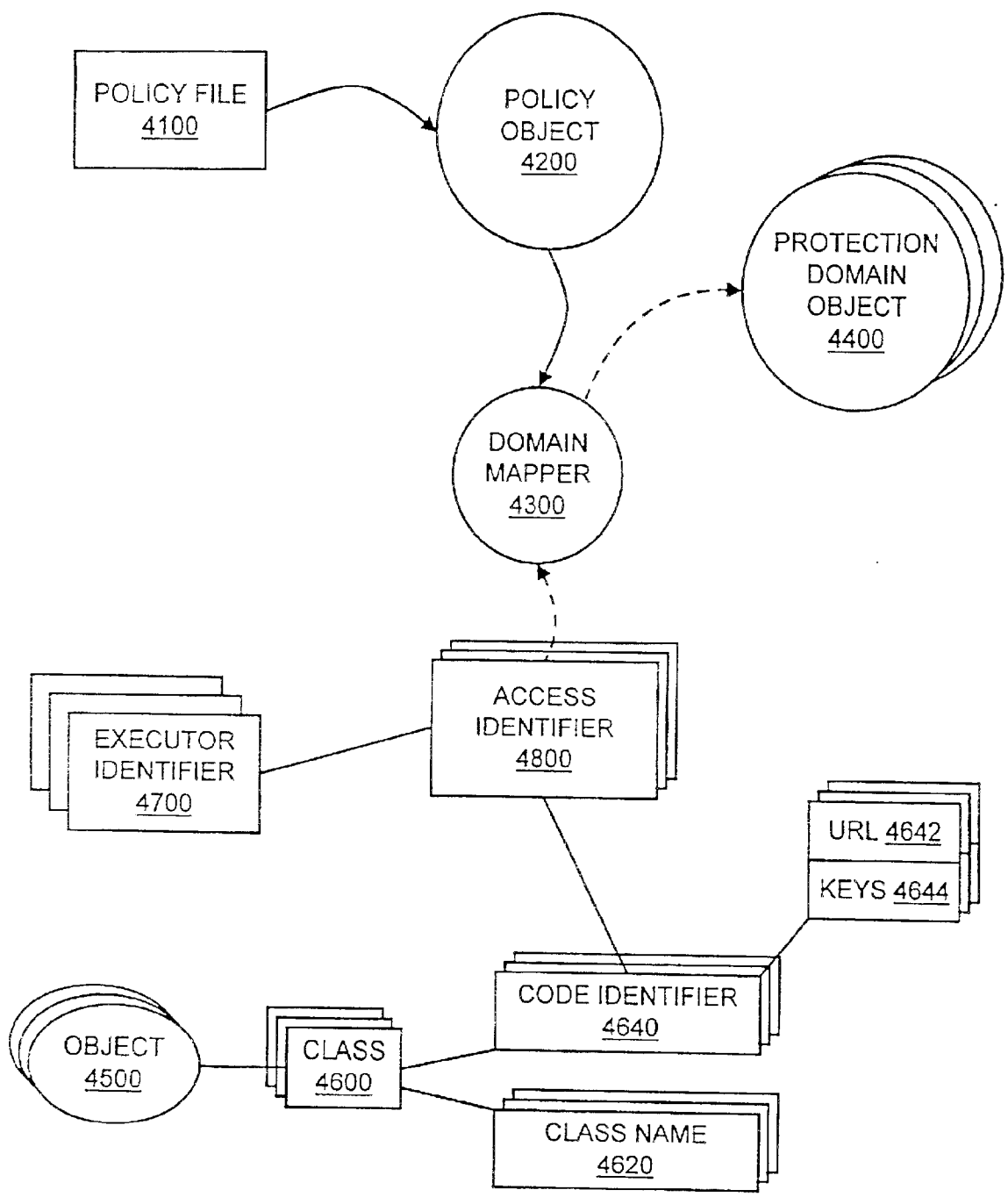
FIG. 4 is a diagram of an exemplary security mechanism illustrating the use of protection domains.

An exemplary security mechanism illustrating the use of protection domains is shown in FIG. 4. The exemplary security mechanism includes a policy file 4100, a policy object 4200, a domain mapper object 4300, and one or more protection domain objects 4400. The security mechanism is implemented using the code execution element 3200 (FIG. 3).

Code execution element 3200 executes the code it receives from code stream 3100 (FIG. 3). For the purpose of explanation, it shall be assumed that the code from code stream 3100 is object-oriented software. Consequently, the code is in the form of methods associated with objects that belong to classes. In response to instructions embodied by code executed by code execution element 3200, code execution element 3200 creates one or more objects 4500. An object is a data structure containing data combined with the procedures or functions that manipulate the data. All objects belong to a class, such as class 4600. Each object belonging to a class has the same fields ("attributes") and the same methods. The methods are the procedures, functions, or routines used to manipulate the object. An object is said to be an "instance" of the class to which the object belongs.

One or more class definitions are contained in the code from code stream 3100. The fields and methods of the objects belonging to a class are defined by a class definition. These class definitions are used by code execution element 3200 to create objects which are instances of the classes defined by the class definitions.

These class definitions are generated from source code written by a programmer. For example, a programmer using a Java development kit enters source code that conforms to the Java programming language into a source file. The source code embodies class definitions and other instructions which are used to generate byte codes that control the execution of the code execution element 3200. Techniques for defining classes and generating code executed by a code execution element, such as a Java virtual machine, are well known to those skilled in the art.

Each class defined by a class definition from code stream 3100 is associated with a class name 4620 and a code identifier 4640. Code execution element 3200 maintains an association between a class 4600 and its class name 4620 and code identifier 4640. The code identifier 4640 represents a source of the code.

A "source of code" is an entity from which computer instructions are received. Examples of sources of code include a file or persistent object stored on a data server connected over a network, a Flash EPROM reader that reads instructions stored on a Flash EPROM, or a set of system libraries.

In an implementation consistent with the present invention, the code identifier 4640 is a composite record containing a uniform resource locator ("URL") 4642 and a set of public cryptographic keys 4644. A URL identifies a particular source. The URL 4642 is a string used to uniquely identify any server connected to the Internet. The URL 4642 may also be used to designate sources local to computer 1100. Typically, the URL 4642 includes a designation of the file and the directory of the file that is the source of the code stream that a server is providing.

A public cryptographic key, herein referred to as a "key," is used to validate the digital signature which may be included in a file used to transport related code and data. Public cryptographic keys and digital signatures are described in further detail in Schneier, *Applied Cryptography*, 1996. The keys 4644 may be contained in the file, contained in a database associating keys with sources (e.g., URLs), or accessible using alternative techniques.

A class may be associated with the digital signature included in the file used to transport code defining the class, or the class definition of the class may be specifically associated with a digital signature. A class that is associated with a valid digital signature is referred to as being signed. Valid digital signatures are digital signatures that can be verified by known keys stored in a database. If a class is associated with a digital signature that cannot be verified, or the class is not associated with any digital signature, the class is referred to as being unsigned. Unsigned classes may be associated with a default key. A key may be associated with a name that may be used to look up the key in a database.

While one code identifier format has been described as including data indicating a source (i.e., cryptographic key and URL), alternate formats are possible. Other information indicating the source of the code, or combinations thereof, may be used to represent code identifiers.

An executor identifier 4700 represents the executor of code. An "executor of code" is a principal (e.g., a user or organization) on whose behalf the code is being executed. An example of an executor might include a person, like "John T. Smith," or an organization, like "Sun Microsystems, Inc." An "executor identifier" is, therefore, some form of identifier that represents the executor. Examples of possible executor identifiers include string names, computer system login names, and employee numbers. When a server receives a request from a client via the RMI, the server may require authentication of the client executor as proof that the client program is executing on behalf of the client executor.

Protection Domains and Permissions

According to an implementation consistent with the present invention, protection domains are used to enforce security within computer systems. A protection domain can be viewed as a set of permissions granted to one or more executors when code from one or more sources is being executed on their behalf. A permission is an authorization by the computer system that allows a principal to execute a particular action or function. Typically, permissions involve an authorization to perform an access to a computer resource in a particular manner. An example of an authorization is an authorization to "write" to a particular directory in a file system (e.g., /home).

A permission can be represented in numerous ways in a computer system. For example, a data structure containing text instructions can represent permissions. An instruction such as "permission executor write/somedirectory/somefile" denotes a permission to write to file "somefile" in the directory "/somedirectory" on behalf of the principal "executor." The instruction denotes which particular action is authorized, the executor authorized to perform the action, and the computer resource upon which that particular action is authorized. In this example, the particular action authorized is to "write" on behalf of the principal "executor." The computer resources upon which the particular action is authorized is a file "/somedirectory/somefile" in a file system of computer 1100. In the example, the file and the directory in which the file is contained are expressed in a conventional form recognized by those skilled in the art.

Permissions can also be represented by objects, herein referred to as permission objects. Attributes of the object represent a particular permission. For example, an object can contain an action attribute of "write," and a target resource attribute of "/somedirectory." A permission object may have one or more permission validation methods which determine whether a requested permission is authorized by the particular permission represented by the permission object.

Policies

The correlation between permissions, executors, and code sources constitutes the security policy of the system. The policy of the system may be represented by one or more files containing instructions. Each instruction establishes a mapping between a particular access identifier and a particular authorized permission. An access identifier is composed of an executor identifier and a code identifier. The permission specified in an instruction applies to all objects that belong to classes that are associated with the code identifier specified in the access identifier of the instruction, when those objects are operated on behalf of the executor specified by the executor identifier in the access identifier of the instruction.

FIG. 5 illustrates an exemplary policy implemented through use of the policy file 4100 (FIG. 4). The format of an instruction in exemplary policy file 4100 is:

<"permission"><executor><URL><key name><action><target>

The <executor> identifies the executor of the code; the combination of the <URL> and the key that corresponds to <key name> constitute a code source; and the <action> and <target> represent a permission. The key is associated with a key name. The key and the corresponding key name are stored together in a key database. The key name can be used to find the key in the key database. For example, consider the following instruction:

permission executor1 file://somesource somekey write/tmp/*

The above instruction represents an authorization of a permission for executor "executor1" to write to any file in "/tmp/*" by an object that belongs to the class associated with the code source "file://somesource"-"somekey" (i.e., URL-key name).

Implied Permissions

One permission does not have to exactly match another permission to be considered "encompassed" by the other permission. When a first permission encompasses a second permission without matching the second permission, the first permission is said to "imply" the second permission. For example, a permission to write to any file in a directory, such as "c:/," implies a permission to write to any specific file in the directory, such as "c:/thisfile." As another example, a permission to read the file "d:/log" granted to "all current employees of Sun Microsystems, Inc." implies a permission to read the file "d:/log" granted to a specific employee of that same organization.

If a permission is represented by a permission object, the validation method for the permission object contains code for determining whether one permission is implied by another. For example, a permission to write to any file in a directory implies a permission to write to any specific file in that directory, and a permission to read from any file in a directory implies a permission to read from any specific file in that directory. However, a permission to write does not imply a permission to read.

Policy Implementing Objects

A variety of objects may be used to implement the policy represented by the access identifiers to permissions mapping contained in policy file 4100. According to the implementation illustrated in FIG. 4, in order to efficiently and conveniently implement the policy, policy object 4200, domain mapper object 4300, one or more protection domain objects 4400, and one or more access identifiers 4800 are provided.

Policy object 4200 is an object for storing the policy information obtained, for example, from policy file 4100. Specifically, policy object 4200 provides a mapping of access identifiers to permissions, and is constructed based on the instructions within policy file 4100. Within the policy object 4200, the access identifiers and their associated authorized permissions may be represented by data structures or objects.

Protection domain objects 4400 are created on demand when new access identifiers 4800 are encountered by domain mapper object 4300. When an access identifier 4800 is received, domain mapper object 4300 determines whether a protection domain object 4400 is already associated with the access identifier 4800. The domain mapper object 4300 maintains data indicating which protection domain objects have been created and the access identifiers associated with the protection domain objects. If a protection domain object is already associated with the access identifier, the domain mapper object 4300 adds a mapping of the access identifier and protection domain object to a mapping of access identifiers and protection domain objects maintained by the domain mapper object 4300.

If a protection domain object is not associated with the access identifier, a new protection domain object is created and populated with permissions. The protection domain object is populated with those permissions that are mapped to the access identifier based on the mapping of access identifiers to permissions in the policy object 4200. Finally, the domain mapper object 4300 adds a mapping of the access identifier and protection domain object to the mapping of access identifiers and protection domain objects as previously described.

In other implementations consistent with the present invention, instead of storing the mapping of access identifiers to protection domain objects in a domain mapper object, the mapping is stored as static fields in the protection domain class. The protection domain class is the class to which protection domain objects 4400 belong. There is only one instance of a static field for a class no matter how many objects belong to the class. The data indicating which protection domain objects have been created and the access identifiers associated with the protection domain objects is stored in static fields of the protection domain class.

Static methods are used to access and update the static data mentioned above. Static methods are invoked on behalf of the entire class, and may be invoked without referencing a specific object.

Exemplary Call Stack

The permission objects, protection domain objects, and policy objects described above are used to determine access rights of a thread. According to an implementation consistent with the present invention, such access rights vary over time based on what code the thread is currently executing, and on which executor's behalf the thread is currently executing. The sequence of calls that resulted in execution of the currently executing code of a thread is reflected in the call stack of the thread. Reference to an exemplary call stack shall be made to explain the operation of a security mechanism that enforces access rights in a way that allows the rights to vary over time.

Figure 6:
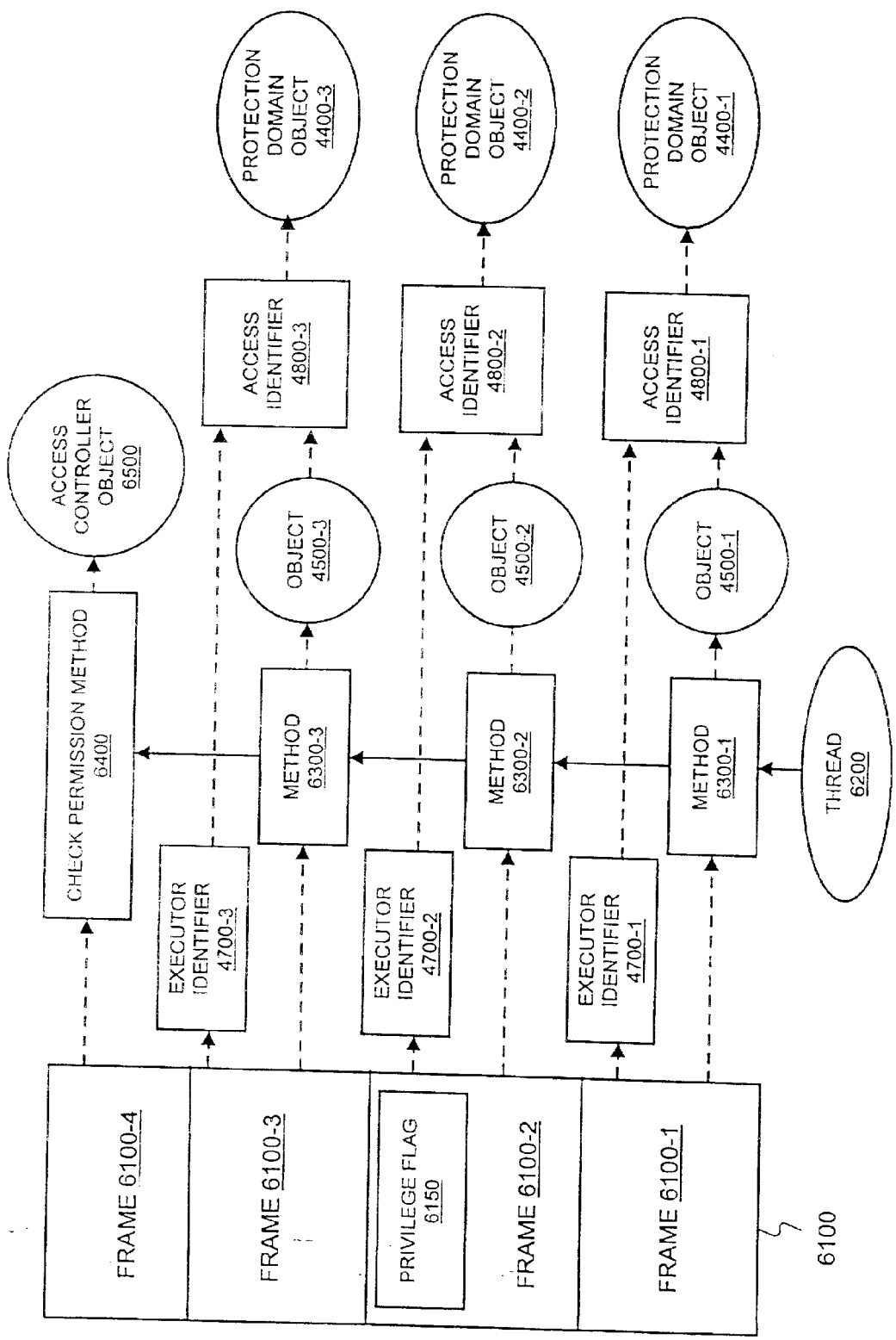
FIG. 6 is a diagram of a call stack associated with a thread executing on the computer of FIG. 2.

FIG. 6 is a block diagram that includes a call stack 6100 associated with a thread 6200 in which the method 6300-1 of an object 4500-1 calls the method 6300-2 of another object 4500-2 that calls the method 6300-3 of yet another object 4500-3 that calls a check permission method 6400 of an access controller object 6500.

Thread 6200 is a thread executing on computer 1100. Call stack 6100 is a stack data structure representing a calling hierarchy of the methods invoked by thread 6200 at any given instance. At the instance illustrated in FIG. 6, call stack 6100 contains a frame (e.g., frame 6100-1) for each method executed by thread 6200, but not yet completed.

Each frame corresponds to the method that has been called but not completed by thread 6200. The relative positions of the frames on the call stack 6100 reflect the invocation order of the methods that correspond to the frames. When a method completes, the frame that corresponds to the method is removed from the top of the call stack 6100. When a method is invoked, a frame corresponding to the method is added to the top of the call stack 6100.

Each frame contains information about the method and the object that correspond to the frame. From this information, the class of the method can be determined by invoking a "get class" method provided for every object by the code execution element 3200. The code identifier of this class can then be determined from the association maintained by the code execution element 3200. Each frame also contains the executor identifier (e.g., executor identifier 4700-1) of the executor on whose behalf the thread is executing. The executor identifier and code identifier can then be composed into an access identifier (e.g., access identifier 4800-1). From the mapping in domain mapper object 4300, the protection domain object associated with the access identifier for a given frame can be determined.

For example, assume thread 6200 invokes method 6300-1. While executing method 6300-1, thread 6200 invokes method 6300-2. While executing method 6300-2, thread 6200 invokes method 6300-3. While executing method 6300-3, thread 6200 invokes method 6400. At this point, call stack 6100 represents the calling hierarchy of methods as shown in FIG. 6. Frame 6100-4 corresponds to method 6400, frame 6100-3 to method 6300-3, frame 6100-2 to method 6300-2, and frame 6100-1 to method 6300-1. When thread 6200 completes method 6400, frame 6100-4 is removed from the call stack 6100.

Method/Permission Relationships

Each frame on the call stack 6100 is associated with a set of permissions. The set of permissions for a given frame is determined by the protection domain object associated with the source from which the code for the given method was received and the principal on whose behalf the code is being executed. The relationship between frames, protection domains, and permissions shall now be described with continued reference to FIG. 6.

Protection domain object 4400-1 is mapped from the access identifier 4800-1 formed by the executor identifier 4700-1 and the code identifier of the class of object 4500-1. Method 6300-1 of object 4500-1 invokes method 6300-2 of object 4500-2 on behalf of executor identifier 4700-2. Protection domain object 4400-2 is mapped from the access identifier 4800-2 formed by the executor identifier 4700-2 and the code identifier of the class of object 4500-2. Method 6300-2 of object 4500-2 invokes method 6300-3 of object 4500-3 on behalf of executor identifier 4700-3. Protection domain object 4400-3 is mapped from the access identifier 4800-3 formed by the executor identifier 4700-3 and the code identifier of the class of object 4500-3.

While protection domain objects are used to organize and determine the access rights of a particular executor and code source, some mechanism must be provided to determine the access rights of a thread having a call stack with multiple methods whose code arrived from multiple sources or whose code is requested to be executed on behalf of multiple principals. According to an implementation consistent with the present invention, this determination is performed by an access controller object, as shall be described in greater detail hereafter.

Exemplary Access Controller

According to an implementation consistent with the present invention, an access controller object is used to determine whether a particular action may be performed by a thread. Specifically, before a resource management object accesses a resource, the resource management object (e.g., object 6300-3) invokes a check permission method 6400 of an access controller object 6500.

In the illustrated example, the resource management method 6300-3 invokes a check permission method 6400 of the access controller object 6500 to determine whether access to the resource is authorized. To make this determination, the check permission method 6400 of the access controller object 6500 performs the steps that shall be described with reference to FIG. 7.

Determining Whether an Action is Authorized

According to an implementation consistent with the present invention, an action is authorized if the permission required to perform the action is included in each protection domain object associated with the thread at the time when a request to determine the authorization is made. A permission is said to be included in a protection domain object if that permission is encompassed by one or more permissions associated with the protection domain object. For example, if an action requires permission to write to a file in the "e:/tmp" directory on behalf of the principal "Bob," then that required permission would be included in protection domain object 4400-1 if the protection domain object 4400-1 explicitly contains or implies that permission.

Assume that thread 6200 is executing method 6300-3 when thread 6200 makes a request for a determination of whether an action is authorized by invoking the check permission method 6400. Assume further that thread 6200 has invoked method 6300-1, method 6300-2, and method 6300-3 and these methods have not completed when thread 6200 invoked method 6400. The protection domain objects associated with thread 6200 when the request for a determination of authorization is made are represented by protection domain objects 4400-1, 4400-2, and 4400-3.

Given the calling hierarchy present in the current example, the required permission to perform an action of writing to file "d:/sys/pwd" on behalf of "Bob" is not authorized for thread 6200 because the required permission is not encompassed by any permission included in protection domain object 4400-1, if the only permission contained therein is "write to e:/tmp."

Privileged Methods

Sometimes the need arises to authorize an action that a method performs irrespective of the protection domain objects associated with the methods that precede the method in the calling hierarchy of a thread. Updating a password is an example of when such a need arises.

Specifically, because the security of a password file is critical, the permissions required to update the password file are limited to very few specialized protection domain objects. Typically, such protection domain objects are associated with methods of objects from trusted code and trusted executors that provide their own security mechanisms. For example, a method for updating a password may require the old password of a user before updating the new password for that user. The method may also require authentication of the principal on whose behalf the update is being requested, and permit updating of the password for only authorized principals.

Because permissions to update passwords are limited to code from specific sources and to code executed on behalf of specific authorized principals, code from all other sources or principals will not be allowed to update the passwords. This is true even in a situation such as that shown in FIG. 6, where code from a remote source (method 6300-1) attempts to change the password by invoking trusted code (method 6300-3) which has permission to update the password. Access is denied in this situation because at least one method in the calling hierarchy (method 6300-1) does not have the necessary permission.

According to an implementation consistent with the present invention, a privilege mechanism is provided to allow methods that do not themselves have the permission to perform actions to nevertheless cause the actions to be performed by calling special "privileged" methods that do have the permissions. This result is achieved by limiting the protection domain objects that are considered to be "associated with a thread" to only those protection domain objects that are associated with a "privileged" method and those methods that are subsequent to the privileged method in the calling hierarchy.

A method may cause itself to be privileged (i.e., enable the privilege mechanism) by invoking a method of a privilege object called for example, beginPrivilege. A method may cause itself to become not privileged (i.e., disable the privilege mechanism) by invoking another method of the privilege object called, for example, endPrivilege. The following code example illustrates one technique for invoking methods that enable or disable the privilege mechanism. Although the code example may resemble the Java programming language by Sun Microsystems Inc., the example is for illustrative purposes only and is not meant to be representative of an actual code implementation.

```
Privileged p = new Privileged();
p.beginPrivilege();
try {
    [sensitive code]
} finally {
    p.endPrivilege();
}
```

The first line of the code example creates a privilege object. The second line invokes a beginPrivilege method of the privilege object that enables the privilege mechanism. The "try finally" statement ensures that the block of code following the "finally" is executed regardless of what happens during execution of the block between the "try" and the "finally." Thus, the privilege disabling method of the privilege object ("p.endPrivilege( )") is always invoked.

The above code can be used, for example, to bound the portion of method 6300-3 that actually accesses the password file. The portion that accesses the password file would be contained in the block designated as "[sensitive code]." The technique illustrated by the above code example explicitly places the responsibility for enabling and disabling the privilege mechanism upon the programmer.

Often, while executing a privileged method, a thread may invoke subsequent methods associated with other protection domain objects that do not include permissions included in the privileged protection domain object. When a thread is executing a subsequent method, an action requested by the thread is only authorized if the required permission is encompassed in the protection domain objects associated with the subsequent method and any methods in the calling hierarchy between the subsequent method and privileged method, inclusively. The advantage of limiting the privilege mechanism in this manner is to prevent methods of untrusted code and of untrusted executors from effectively "borrowing" the permissions associated with privileged methods of trusted code and trusted executors when the methods of the untrusted code and untrusted executors are invoked by the privileged methods.

In an alternate implementation consistent with the present invention, a method causes itself to be privileged or not privileged by invoking static methods of the access controller class. The access controller class is the class to which access controller objects belong. As demonstrated in the following code example, using static methods that are associated with the access controller class avoids the need of having to create a privilege object in order to enable the privilege mechanism.

The following code example illustrates one technique for invoking methods that enable or disable the privilege mechanism. Assume for the purpose of illustration that the access controller class name is AccessControl. Although the code example may resemble the Java programming language by Sun Microsystems Inc., the example is for illustrative purposes only and is not meant to be representative of an actual code implementation.

```
AccessControl.beginPrivilege();
try {
    [sensitive code]
} finally {
    AccessControl.endPrivilege();
}
```

Enabling Invocations

A thread may invoke the same method at different levels in a calling hierarchy. For example, a method X may call a method Y which may call the method X. Consequently, a method, such as method 6300-2, that is invoked as a privileged method could be invoked a second time without enabling the privilege mechanism in the second invocation. To properly determine the protection domain objects associated with a thread while the privilege mechanism is enabled, a mechanism is provided to track which invocation of the privileged method enabled the privilege mechanism. The invocation in which a thread enables the privilege mechanism is referred to as an "enabling invocation."

One technique to track which invocations of a particular method are enabling invocations is to set a flag in the frame corresponding to each enabling invocation. This may be accomplished by setting the privilege flag 6150 in the frame corresponding to each enabling invocation, when the privilege enabling method of each privilege enabling object is invoked during execution of a method.

According to an implementation consistent with the present invention, each frame has a privilege flag value. When any frame is added to the call stack 6100, the initial value of the privilege flag indicates that the corresponding method is not privileged. The privilege flag of any frame is only set to a value indicating the corresponding method is privileged when the corresponding method enables the privilege.

After a method that enables the privilege mechanism completes, the value of the privilege flag 6150 will not carry over to the next invocation of the method. The value will not carry over because when the new frame corresponding to the method is added to the call stack 6100, the initial value of the privilege flag is set to indicate that the corresponding method is not privileged. Maintaining the value of the privilege flag in this manner disables the privilege mechanism when a privileged method completes regardless of whether the privilege mechanism is explicitly disabled by the programmer.

Figure 7:
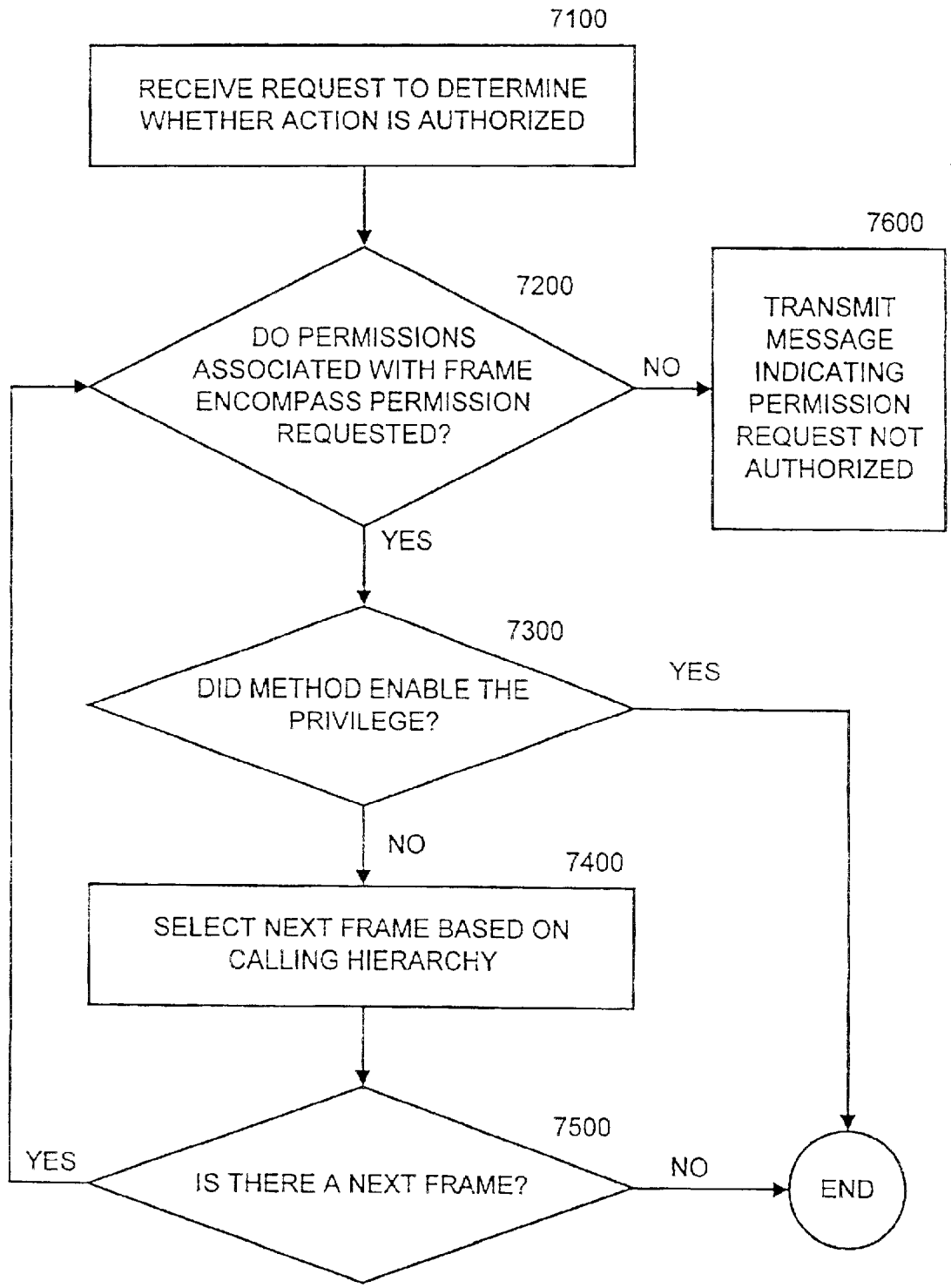
FIG. 7 is a flowchart of processing performed by the check permission method of FIG. 6 in an implementation consistent with the principles of the present invention.

FIG. 7 is a flowchart of processing performed by the check permission method 6400 in FIG. 6. With reference to FIG. 6, assume that the thread 6200 invokes a method 6300-1. During execution of method 6300-1, thread 6200 invokes method 6300-2, then method 6300-3. Assume further that method 6300-2 is privileged.

In step 7100, when a resource management object receives a request to access an object, the check permission method 6400 is invoked to determine whether the requested action is authorized. In FIG. 6, the method 6300-3 makes the request to access an object by invoking the check permission method 6400 of the access controller object 6500, and passing to it as a parameter the permission required to perform the action.

Steps 7200 through 7500 define a loop in which permissions associated with the frames in the call stack are checked. The loop continues until a privileged method is encountered, or all of the frames in the call stack have been checked. For the purpose of explanation, the frame whose privileges are currently being checked is referred to as the "selected frame," and the method associated with that frame is referred to as the "selected method."

In step 7200, a determination is made as to whether one of the permissions associated with the selected frame encompasses the permission required. The permissions associated with a frame are the permissions of the protection domain object that is associated with the frame. If the determination made in step 7200 is that a permission associated with the selected frame encompasses the permission required, control passes to step 7300.

During the first iteration of the loop, the frame that immediately precedes the frame associated with the check permission method of the access controller object is inspected. In the example, the frame associated with the check permission method 6400 is frame 6100-4. The frame that immediately precedes frame 6100-4 is frame 6100-3. Consequently, during the first iteration of the loop, frame 6100-3 will be inspected. Frame 6100-3 is associated with protection domain object 4400-3. If a permission associated with protection domain object 4400-3 encompasses the permission required, control passes to step 7300.

In step 7300, a determination is made of whether invocation of the selected method represents the enabling invocation. This determination is based on the privilege flag of the frame corresponding to the selected method. If the determination is that the invocation of the selected method does not represent the enabling invocation, control passes to step 7400. In this example, the privilege status of frame 6100-3 is not set to indicate that the frame represents the enabling invocation, thus control passes to step 7400.

In step 7400, the next frame is selected. The next frame is the frame below the current frame based on the calling hierarchy represented by call stack 6100. In this example, the frame below the current frame 6100-3 is frame 6100-2. The method corresponding to frame 6100-2 is method 6300-2.

In step 7500, a determination is made of whether a frame was selected in step 7400. If a frame was selected, control reverts to step 7200. In the current example, control passes to step 7200 because frame 6100-2 was selected. In step 7200, the determination that is made is that the protection domain object associated with frame 6100-2 (protection domain object 4400-2) includes a permission encompassing the permission required because in the example a permission associated with protection domain object 4400-2 explicitly encompasses the permission required. Control then passes to step 7300.

In step 7300, the determination that is made is that the invocation of a selected method represents the enabling invocation because the privilege flag 6150 indicates that the invocation corresponding to frame 6100-2 is an enabling invocation. A message is transmitted indicating that the permission request is valid. Then, the permission check ends.

By exiting the permission check at step 7300 when the selected method represents the enabling invocation, authorization of the requested action is based on the privileged protection domain object and any protection domain objects associated with methods invoked after the enabling invocation.

Now assume that the privilege mechanism was never invoked in the current example. Thus in step 7300, the determination that is made is that invocation of the selected method does not represent the enabling invocation because the privilege flag 6153 indicates that the invocation corresponding to frame 6100-2 is not an enabling invocation.

In step 7400, the next frame selected is frame 6100-1 because the frame below the current frame 6100-2 is frame 6100-1, and the method corresponding to frame 6100-1 is method 6300-1. In step 7500, the determination that is made is that a next frame was selected in step 7400. Thus, control reverts to step 7200 again.

In step 7200, the determination that is made is that the protection domain object associated with frame 6100-1 (protection domain object 4400-1) does not include the permission required because no permission associated with protection domain object 4400-1 in the example encompasses the permission required. Control then passes to step 7600.

In step 7600, a message indicating that the requested action is not authorized is transmitted. In an implementation consistent with the present invention, the message is transmitted by throwing an Exception error.

When at least one protection domain object associated with a thread does not include a permission encompassing the permission required, the requested action is not authorized. An action is authorized only when all the protection domain objects associated with a thread include the permission required at the time that the request is made for a determination of whether the action is authorized.

In an implementation consistent with the present invention, when a thread ("parent thread") causes the spawning of another thread ("child thread"), the protection domain objects associated with the parent thread are "inherited" by the child thread. The protection domain objects may be inherited by, for example, retaining the call stack of a parent thread when the child thread is created. When the steps shown in FIG. 7 are executed to determine whether an action is authorized, the call stack that is traversed is treated as if it included the call stack of the parent thread.

In another implementation consistent with the present invention, a child thread does not inherit the protection domain objects of the parent thread. In this case, the call stack that is traversed is treated as if it did not include the parent's call stack.

One advantage of basing the authorization of a thread to perform an action on the protection domain objects associated with the thread is that the permissions can be based on the source of the code the thread is executing and the principal on whose behalf the code is being executed.

As mentioned earlier, objects are created from class definitions in code received by code execution element 3200. The source of code a thread is executing is the source of code of the method. The source of code of a method is the source of the class definition used to define the class to which the method's object belongs. The executor of the code is the principal on whose behalf the code is being executed. This may include the executor of a process or program operating on a client system.

Because the protection domain objects are associated with the source and executor of code of a method, as described previously, the permissions authorized for a thread can be based on the source and executor of the code of each method invoked by a thread. Thus, it can be organized so that code from a particular source or code executed on behalf of a particular principal is associated with the permissions appropriate for security purposes.

An advantage of the privilege mechanism described above is that performance of sensitive operations in which security is critical can be limited to methods from trusted sources and methods executed on behalf of trusted executors. Furthermore, these operations can be performed on behalf of methods based on less secure code. Methods performing sensitive operations typically rely on their own security mechanisms (e.g., password authentication methods). When a thread invokes the privilege mechanism, the scope of the permissions of the privileged domain, which typically entail a high security risk, are limited to the enabling invocation. This prevents a method invoked within the privileged method, such as a method based on untrusted code or an untrusted executor, from acquiring the capability to perform operations posing a high security risk.

While one method of tracking which invocations are enabling invocations is described above, various alternative methods of tracking enabling invocations are possible. Therefore, it is understood that the present invention is not limited to any specific method for tracking enabling invocations.

Conclusion

Systems and methods consistent with the principles of the present invention provide a security enforcement mechanism in which access permissions of a thread vary over time based on the source and executor of the code being executed.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun logo, Java, and Java-based trademarks are trademarks or registered trademarks of Sun Microsystems Inc. in the United States and other countries.

What is claimed is:

1. A method for providing security in a computing environment, wherein permissions for accessing one or more resources of a plurality of resources are stored in a policy file, the method comprising:

receiving a request from an operation to access a resource, wherein the operation may invoke one or more methods;

creating one or more protection domain objects corresponding respectively, to each of the one or more invoked methods based on permissions stored in the policy file; and determining whether the access requested by the operation is authorized based on the one or more protection domain objects associated with the operation.

2. The method of claim 1, further comprising storing a frame on a call stack, in an order of invocation, corresponding to each method invoked by the operation.

3. The method of claim 2, wherein each frame includes a privilege flag that indicates whether the corresponding method is a privileged method.

4. The method of claim 1, further comprising granting access to the resource when the requested access is authorized.

5. The method of claim 1, wherein the requested access is authorized when permission required to access the resource is included in each of the one or more protection domain objects associated with the operation when the request to access the resource was received.

6. The method of claim 1, further comprising denying access to the resource when the requested access is denied.

7. The method of claim 1, wherein the requested access is denied when at least one protection domain object does not include a permission required to access the resource.

8. The method of claim 3, wherein the one more methods invoked by the operation becomes privileged by setting the privilege flag.

9. The method of claim 8, further comprising:
determining whether permissions included in the one or more protection domain objects associated with the methods corresponding to each frame subsequently located on the call stack relative to a frame having a privilege flag set authorizes the requested access.

10. The method of claim 9, further comprising:
granting access to the resource when the permissions in the one or more protection domain objects authorize the requested access.

11. The method of claim 9, further comprising:
denying access to the resource when at least one of the permissions does not authorize access to the resource.

12. The method of claim 1, wherein the one or more protection domain objects include permissions based on an access identifier.

13. The method of claim 12, wherein the access identifier comprises a code identifier and an execution identifier.

14. A system for providing security in a computing environment, wherein permissions for accessing one or more resources of a plurality of resources are stored in a policy file, the system comprising:
means for receiving a request from an operation to access a resource, wherein the operation may invoke one or more methods;
means for creating one or more protection domain objects corresponding respectively, to each of the one or more invoked methods based on permissions stored in the policy file; and
means for determining whether the access requested by the operation is authorized based on the one or more protection domain objects associated with the operation.

15. The system of claim 14, further comprising means for storing a frame on a call stack, in an order of invocation, corresponding to each method invoked by the operation.

16. The system of claim 15, wherein each frame includes a privilege flag that indicates whether the corresponding method is a privileged method.

17. The system of claim 14, further comprising granting access to the resource when the requested access is authorized.

18. The system of claim 14, wherein the requested access is authorized when permission required to access the resource is included in each of the one or more protection domain objects associated with the operation when the request to access the resource was received.

19. The system of claim 14, further comprising means for denying access to the resource when the requested access is denied.

20. The system of claim 15, wherein the requested access is denied when at least one protection domain object does not include a permission required to access the resource.

21. The system of claim 20, wherein the one or more methods invoked by the operation becomes privileged by setting the privilege flag.

22. The system of claim 21, further comprising:
means for determining whether permissions included in the one or more protection domain objects associated with the methods corresponding to each frame subsequently located on the call stack relative to a frame having a privilege flag set authorizes the requested access.

23. The system of claim 22, further comprising:
means for granting access to the resource when the permissions in the one or more protection domain objects authorize the requested access.

24. The system of claim 22, further comprising:
means for denying access to the resource when at least one of the permissions does not authorize access to the resource.

25. The system of claim 14, wherein the one or more protection domain objects include permissions based on an access identifier.

26. The system of claim 25, wherein the access identifier comprises a code identifier and an execution identifier.

27. A computer-readable medium containing instructions for a method for providing security in a computing environment, wherein permissions for accessing one or more resources of a plurality of resources are stored in a policy file, the method comprising:
receiving a request from an operation to access a resource, wherein the operation may invoke one or more methods;
creating one or more protection domain objects corresponding respectively, to each of the one or more invoked methods based on permissions stored in the policy file; and
determining whether the access requested by the operation is authorized based on the one or more protection domain objects associated with the operation.

28. The computer-readable medium of claim 27, further comprising storing a frame on a call stack, in an order of invocation, corresponding to each method invoked by the operation.

29. The computer-readable medium of claim 28, wherein each frame includes a privilege flag that indicates whether the corresponding method is a privileged method.

30. The computer-readable medium of claim 27, further comprising granting access to the resource when the requested access is authorized.

31. The computer-readable medium of claim 27, wherein the requested access is authorized when permission required to access the resource is included in each of the one or more protection domain objects associated with the operation when the request to access the resource was received.

32. The computer-readable medium of claim 27, further comprising denying access to the resource when the requested access is denied.

33. The computer-readable medium of claim 28, wherein the requested access is denied when at least one protection domain object does not include a permission required to access the resource.

34. The computer-readable medium of claim 29, wherein the one or more methods invoked by the operation becomes privileged by setting the privilege flag.

35. The computer-readable medium of claim 34, further comprising:

determining whether permissions included in the one or more protection domain objects associated with the methods corresponding to each frame subsequently located on the call stack relative to a frame having a privilege flag set authorizes the requested access.

36. The computer-readable medium of claim 35, further comprising:

granting access to the resource when the permissions in the one or more protection domain objects authorize the requested access.

37. The computer-readable medium of claim 35, further comprising:

denying access to the resource when at least one of the permissions does not authorize access to the resource.

38. The computer-readable medium of claim 27, wherein the one or more protection domain objects include permissions based on a identifier.

39. The computer-readable medium of claim 38, wherein the access identifier comprises a code identifier and an execution identifier.

* * * * *

UNITED STATES PATENT AND TRADEMARK OFFICE
CERTIFICATE OF CORRECTION

PATENT NO. : 6,934,758 B2
DATED : August 23, 2005
INVENTOR(S) : Robert W. Scheifler et al.

It is certified that error appears in the above-identified patent and that said Letters Patent is hereby corrected as shown below:

Column 24,
Line 7, "on a identifier" should read -- on an access identifier --.

Signed and Sealed this

Twenty-fifth Day of October, 2005

JON W. DUDAS
*Director of the United States Patent and Trademark Office*